US 11,986,795 B2

United States Patent
Nakashima et al.

(10) Patent No.: US 11,986,795 B2
(45) Date of Patent: May 21, 2024

(54) ORGANIC-HALOGEN-COMPOUND-ABSORBING AGENT, METHOD FOR REMOVING ORGANIC HALOGEN COMPOUND FROM HYDROCARBON GAS IN WHICH SAID AGENT IS USED, DEVICE FOR ABSORBING HALOGEN COMPOUND IN WHICH SAID METHOD IS USED, AND METHOD FOR PRODUCING HYDROCARBON GAS

(71) Applicants: CLARIANT CATALYSTS (JAPAN) K.K., Tokyo (JP); ENEOS Corporation, Tokyo (JP)

(72) Inventors: Tadahito Nakashima, Toyama (JP); Hyun-Joong Kim, Toyama (JP); Kaoru Fujiwara, Tokyo (JP)

(73) Assignees: CLARIANT CATALYSTS (JAPAN) K.K., Tokyo (JP); ENEOS CORPORATION, Tokyo (JP)

( * ) Notice: Subject to any disclaimer, the term of this patent is extended or adjusted under 35 U.S.C. 154(b) by 563 days.

(21) Appl. No.: 17/275,383

(22) PCT Filed: Jul. 11, 2019

(86) PCT No.: PCT/JP2019/027521
§ 371 (c)(1),
(2) Date: Mar. 11, 2021

(87) PCT Pub. No.: WO2020/059264
PCT Pub. Date: Mar. 26, 2020

(65) Prior Publication Data
US 2022/0055011 A1    Feb. 24, 2022

(30) Foreign Application Priority Data
Sep. 18, 2018 (JP) .................................. 2018-173289

(51) Int. Cl.
*B01D 53/04* (2006.01)
*B01D 53/14* (2006.01)
(Continued)

(52) U.S. Cl.
CPC .............. *B01J 20/12* (2013.01); *B01D 53/04* (2013.01); *B01D 53/1406* (2013.01);
(Continued)

(58) Field of Classification Search
CPC . B01J 20/12; B01J 20/041; B01J 20/06; B01J 20/04; B01J 20/28; B01D 53/1406;
(Continued)

(56) References Cited

U.S. PATENT DOCUMENTS 3,315,015 A * 4/1967 Greene ...................... B01J 2/22
241/3
6,074,460 A * 6/2000 Lansbarkis ............ B01D 53/02
95/143
(Continued)

FOREIGN PATENT DOCUMENTS

EP    3108960 A1 * 12/2016
JP    9-225296 A    9/1997
(Continued)

OTHER PUBLICATIONS

English Translation of International Search Report and Written Opinion of the International Searching Authority, dated Sep. 24, 2019, with respect to International Application No. PCT/JP2019/027521.

(Continued)

*Primary Examiner* — Frank M Lawrence, Jr.
(74) *Attorney, Agent, or Firm* — Scott R. Cox

(57) ABSTRACT

A process for treating a petroleum fraction and for efficiently absorbing an organic halogen compound from a fluid mixture of the organic halogen compound and an inorganic
(Continued)

halogen compound derived from crude oil. Also disclosed is an improvement in absorption performance of a halogen-compound-absorbing material, thereby reducing the frequency with which the absorbing material is exchanged. The absorbing agent includes attapulgite (palygorskite) having high absorption performance with respect to organic halogen compounds. Also disclosed is an absorption column in which the aforementioned absorbing agent and a halogen-compound-absorbing agent, that includes zinc oxide, are disposed in series, thereby making it possible to raise the treatment performance with respect to a fluid that contains, in high concentrations, the organic halogen compound in addition to the inorganic halogen compound.

13 Claims, 1 Drawing Sheet

(51) Int. Cl.
  *B01J 20/04* (2006.01)
  *B01J 20/06* (2006.01)
  *B01J 20/12* (2006.01)
(52) U.S. Cl.
  CPC ............. *B01J 20/041* (2013.01); *B01J 20/06* (2013.01); *B01D 2252/10* (2013.01); *B01D 2257/2045* (2013.01); *B01D 2257/2064* (2013.01); *C10G 2300/201* (2013.01)
(58) Field of Classification Search
  CPC ........ B01D 2252/10; B01D 2257/2045; B01D 2257/2064; B01D 2253/11; B01D 2253/1124; B01D 2256/24; B01D 2257/206; B01D 2259/414; B01D 53/02; B01D 53/0423; B01D 53/14; C10G 2300/201; C10G 25/00; C10G 35/00; C01B 33/40; Y02P 20/151
  USPC ..... 95/131, 132, 142; 96/132; 502/407, 410, 502/414
  See application file for complete search history.

(56) References Cited

U.S. PATENT DOCUMENTS

| | | | |
|---|---|---|---|
| 6,558,641 | B1 | 5/2003 | Bailey et al. |
| 6,908,497 | B1 * | 6/2005 | Sirwardane ............ B01D 53/02 423/230 |
| 9,914,111 | B1 * | 3/2018 | Feng ........................ B01J 20/24 |
| 2014/0296607 | A1 | 10/2014 | Baptist et al. |
| 2017/0246613 | A1 | 8/2017 | Chen et al. |
| 2018/0214844 | A1 | 8/2018 | Davis et al. |
| 2019/0391123 | A1 * | 12/2019 | Mertz ................ G01N 33/0073 |
| 2020/0023336 | A1 | 1/2020 | Nakashima et al. |

FOREIGN PATENT DOCUMENTS

| | | |
|---|---|---|
| JP | 2000-140627 A | 5/2000 |
| JP | 2001-72984 A | 3/2001 |
| JP | 2008-184512 A | 8/2008 |
| JP | 2013-166142 A | 8/2013 |
| WO | WO2018154443 A1 | 8/2018 |

OTHER PUBLICATIONS

English Translation of International Preliminary Report on Patentability of the International Searching Authority, dated Mar. 23, 2021, with respect to International Application No. PCT/JP2019/027521.

* cited by examiner

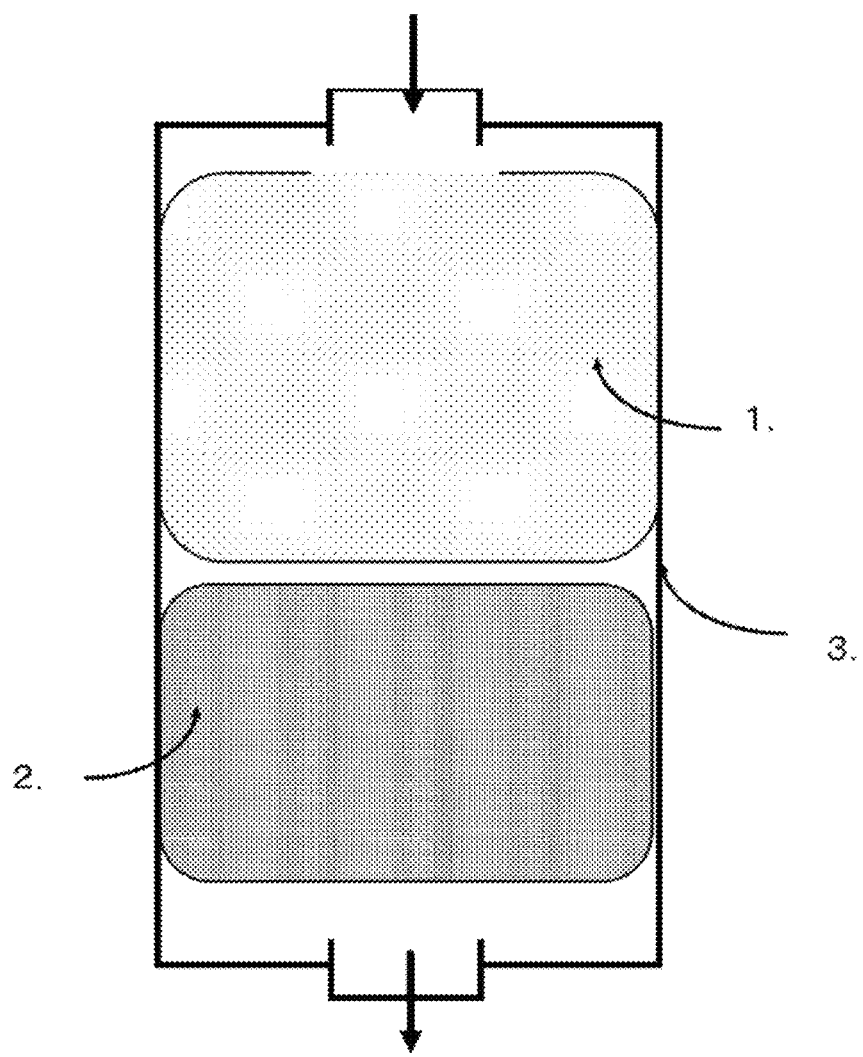

ORGANIC-HALOGEN-COMPOUND-ABSORBING AGENT, METHOD FOR REMOVING ORGANIC HALOGEN COMPOUND FROM HYDROCARBON GAS IN WHICH SAID AGENT IS USED, DEVICE FOR ABSORBING HALOGEN COMPOUND IN WHICH SAID METHOD IS USED, AND METHOD FOR PRODUCING HYDROCARBON GAS

FIELD OF THE INVENTION

The present invention relates to techniques for removing an organohalogen compound, e.g., a halogenated hydrocarbon, from a fluid such as a gas generated in various industrial processes, and more particularly to an absorbent to efficiently remove an undesired organohalogen compound e.g. a halogenated hydrocarbon from a hydrocarbon gas distilled from a catalytic reformer in a petroleum refining step and to a method of absorbing and removing a halogen compound using the absorbent, and to a halogen absorbing apparatus.

BACKGROUND OF THE INVENTION

In the petroleum refining step, as the halogen compound contained in the hydrocarbon, there are those derived from crude oil and those derived from a catalytic reaction. Further, it is known that an inorganic halogen compound and an organohalogen compound exist as components thereof. Such halogen compounds, particularly inorganic halogen compounds such as hydrogen halide, cause problems such as apparatus corrosion of downstream processes. As an organohalogen compound halogen compounds of hydrocarbons such as propane chloride can be mentioned. In a moving bed type catalytic reforming process in which the reaction step and the catalyst regeneration step are separated from each other, since the catalyst regenerated by oxychlorination brings chlorine into the reaction step, hydrogen chloride is similarly generated in the reactor, and both the hydrogen chloride and the chlorohydrocarbon are discharged out of the reactor together with a product.

The halogens in the above halogen compounds comprises chlorine, bromine, iodine or the like, and thus the above halogen compounds comprise chlorides, bromides, iodides or the like, but hereafter, for simplicity of description, an inorganic halogen compound is mainly described as hydrogen chloride and an organohalogen compound is described as a chlorohydrocarbon. However, the scope of application of the present invention is not limited thereto.

Among the chlorides described above, a method of removing hydrogen chloride using an alkali-based absorbent or an alkali cleaning liquid is known, but the use of a liquid is accompanied by a complicated treatment and tends to cause an accident or the like, and a solid absorbent has recently become widely used. As an example of a solid absorbent for hydrogen chloride, an absorbent in which a zinc oxide and a calcium oxide are used as an absorbing component and a clay mineral is added as an inert binder to this (see Patent Document 1) or a method of absorbing a chloride in a hydrocarbon using activated alumina carrying an alkali metal is known (see Patent Document 2)

An absorbent using a zinc oxide is known as an absorbent capable of efficiently reacting and removing not only hydrogen chloride but also hydrocarbons chloride (Patent Documents 1 and 3). In general, since a chlorohydrocarbon has lower reactivity with an absorbent containing zinc oxide than hydrogen chloride, an absorbent containing silica magnesia composite oxide and zinc oxide has also been proposed as an absorbent capable of improving it and efficiently removing a chlorohydrocarbon (see Patent Document 4).

Even an absorbent having enhanced reactivity to a chlorinated hydrocarbon described in Patent Document 4 described above has lower absorptivity of a chlorinated hydrocarbon than a chlorinated hydrocarbon. As a reason for this, it is considered that hydrogen chloride has a relatively high ionic bonding property (acidity) so that an inorganic halogen compound absorber (e.g., zinc oxide) and a neutralization reaction rate relating to a neutralization reaction are large, whereas a chlorohydrocarbon has a relatively low ionic bonding property (chlorine-carbon bond), so that reactivity or adsorption property between zinc oxide and the like could be low. Therefore, when an attempt is made to improve the treatment ability of the chlorohydrocarbon by increasing the composition ratio of the silica magnesia composite oxide to the zinc oxide, conversely it tends to suffer from a dilemma that the absorption ability of hydrogen chloride decreases. It is common at the outlet of a chlorine adsorption tower when a conventional absorbent is used, that a leak of chlorohydrocarbon is detected first as the fluid treatment proceeds.

When the distribution of chlorine contained in the spent absorbent whose use was stopped immediately after the detection of the chlorohydrocarbon was examined, the absorbent located on the inlet side of the treated gas has a reasonable chlorine content ratio (saturated status) by chlorinated reaction of zinc oxide to zinc chloride ($ZnO \rightarrow ZnCl_2$). On the other hand, the chlorine content of the absorbent located on the outlet side of the treatment gas becomes low, and the unsaturated layer becomes about 1/3 of the total (about 2/3 of the total for the saturated layer) depending on the equipment shape and the operating conditions, and the frequency of replacement of the absorbent becomes high, which becomes a large factor of increase in cost, and if the frequency is attempted to be reduced, the risk of the chlorinated hydrocarbon leak becomes high. Thus, it is required to reduce the frequency of replacement of the absorbent and to safely operate the chlorine adsorption tower for a long period of time by increasing the thickness of the saturated state layer.

In addition, the quality of raw crude oil used in the petroleum refining process is not necessarily stable. In some cases, the amount of chloride generated in the process and the ratio of the chlorohydrocarbon which is an inorganic substance and the chlorohydrocarbon which is an organic substance vary depending on the conditions at that time, such as the reaction type and the raw material. In such a case, when an absorbent as described in the above documents is filled, problems tend to occur such that it is difficult to predict the lifetime of the absorbent and it is necessary to increase the frequency of replacement of the absorbent when the discharge amount of the chlorohydrocarbon is large. Therefore, it is preferable that the chlorinated hydrocarbon absorbing ability in the chloride absorbing tower can be adjusted according to the process conditions thereof such as the concentration ratio of the chlorohydrocarbon and the hydrochloride.

As mentioned above, although the removal technology of halogen compounds is advancing, needs from the market are seeking an absorbent capable of appropriately treating both inorganic halogen compounds and organohalogen compounds, and the present state of the art is not responding to the demand.

PRIOR ART LITERATURE

Patent Document 1: JPS52-035036
Patent Document 2: JPH07-506048

Patent Document 3: JP3542055
Patent Document 4: JP5259090

SUMMARY OF THE INVENTION

Problems to Solve

An object of the present invention is to provide an absorbent capable of efficiently and preferably selectively removing an organohalogen compound (e.g., a chlorohydrocarbon) from a fluid containing an organohalogen compound, e.g., a chlorohydrocarbon.

Other objects of the present invention will become apparent from the following description.

Solution for the Problem

In view of the above actual conditions, the present inventors have conducted intensive studies on improving the removal ability of a halogen compound removing agent as a problem in order to solve the drawbacks of the prior art. As a result, the following findings and guidelines were obtained as ideas for solving the problem of the present invention.

(1) The aforementioned literature aims to absorb both chlorinated and chlorinated hydrocarbons by a single absorbent. Therefore, it has not been possible to solve the problem that the processing ability of the chlorohydrocarbon is saturated and leakage occurs before the absorption ability of hydrogen chloride is saturated.

(2) Therefore, the conventional idea of treating both chlorinated hydrocarbons and halogenated hydrogens with a single absorbent is switched to an idea of functional separation by an absorbent capable of selectively absorbing chlorinated hydrocarbons. The treatment ability of chlorine compounds was examined to be optimized by combining an absorbent with high chloride hydrocarbon absorption ability and a conventional halogen compound absorbent.

(3) In the process, attapulgite, a kind of clay-based minerals, was tested, and it was found that the absorption capacity of hydrocarbons was much higher than that of conventional absorbents. It has been found that, rather than mixing attapulgite having such characteristics with a compound of hydrogen chloride absorption, it is possible to absorb hydrogen chloride and chlorohydrocarbon in a balanced manner by connecting and arranging an attapulgite-containing absorbent after an inorganic halogen compound absorber. As a result, the present invention was achieved by the total throughput of the hydrocarbon fluid increases.

The present invention relates to the following:
1. An organohalogen compound absorbent comprising attapulgite.
2. The absorbent as described above in 1, wherein the content of attapulgite is at least 40% by weight, based on the total weight of the absorbent.
3. The absorbent as described above in any one of 1 or 2 in the form of a molded body.
4. The absorbent as described above in any one of 1 to 3 for removing an organohalogen compound contained in a hydrocarbon gas.
5. The absorbent as described above in any one of 1 to 4 for removing an organohalogen compound from a hydrocarbon gas previously treated with an inorganic halogen compound absorber comprising an zinc oxide and/or a calcium oxide.
6. The absorbent as described above in any one of 1 to 5, wherein the organohalogen compound is a chlorohydrocarbon.
7. A method of removing an organohalogen compound from a hydrocarbon gas comprising an organohalogen compound and optionally an inorganic halogen compound, the method comprising steps of:
   i) contacting the hydrocarbon gas with the absorbent as described in any one of 1 to 6.
8. A method of removing an organohalogen compound and an inorganic halogen compound from a hydrocarbon gas comprising an organohalogen compound and an inorganic halogen compound, the method comprising steps of:
   a) contacting the hydrocarbon gas with an inorganic halogen compound absorber, and
   b) contacting the hydrocarbon gas obtained after step a) with the absorbent as described above in any one of 1 to 6 in the downstream of step a).
9. The method as described above in 8, wherein the inorganic halogen compound absorber comprises a zinc oxide and/or a calcium oxide.
10. The method as described in any one of 7 to 9, wherein the inorganic halogen compound is hydrogen chloride and the organohalogen compound is a chlorohydrocarbon.
11. The method as described in 10, wherein the concentration of hydrogen chloride in the hydrocarbon gas is reduced to 0.1 mg-Cl/Nm$^3$ or less with the inorganic halogen compound absorber in step a), then chlorohydrocarbon is absorbed and removed from the hydrocarbon gas in step b).
12. A halogen compound absorbing apparatus comprising an inorganic halogen absorbing region equipped with an inorganic halogen compound absorber, and an organohalogen compound absorbing region arranged in series at a subsequent stage of the inorganic halogen compound absorbing region and equipped with the organohalogen compound absorbent as described in any one of 1 to 6.
13. A method for producing a hydrocarbon gas having a low chloride concentration and a low chloride hydrocarbon concentration from a hydrocarbon gas distilled from a catalytic reforming step, the method comprises the following steps of:
   1) contacting the hydrocarbon gas distilled from the catalytic reforming step with an inorganic halogen compound absorber, and
   2) contacting the hydrocarbon gas obtained after step 1) with the absorbent of claim 1 in a downstream of step 1).
14. The method as described in 13, wherein the inorganic halogen compound absorber comprises a zinc oxide and/or a calcium oxide.
15. The method as described in 13 or 14, wherein the hydrocarbon gas with the hydrogen chloride concentration of 0.1 mg-Cl/Nm$^3$ or less and the chlorohydrocarbon concentration is 0.3 mg-Cl/Nm$^3$ or less is produced.

Examples of the halogen compound to be removed from the hydrocarbon gas by the absorbent, method and/or apparatus of the present invention comprise an organohalogen compound and an inorganic halogen compound. Examples of the halogen comprises chlorine, bromine and Iodine. Examples of the organohalogen compound comprise organic chlorides for example chlorinated hydrocarbons such as ethylene chloride, propane chloride and butane chloride.

Examples of the inorganic halogen compound comprise inorganic chlorides such as hydrogen chloride. The halogen compounds to be treated are preferably in the form of a fluid and more preferably in the form of a gas.

As noted above, for the sake of simplicity, primarily above in this specification embodiments in which the halogen is chlorine will be described in detail, particularly those in which the inorganic halogen compound is hydrogen chloride and/or the organohalogen compound is a hydrocarbon. Thus, for example, while an inorganic halogen compound absorber may be described as a "hydrogen chloride absorber" and an organohalogen compound absorbent as a "chlorohydrocarbon absorbent", the description herein is also applicable to embodiments relating to halogen compounds other than hydrogen chloride and hydrocarbons, and it will be possible for those skilled in the art to appropriately understand other embodiments by referring to these descriptions.

Effects of the Invention

The chlorohydrocarbon absorbent of the present invention can be applied to removal of an organic chloride generated in a chemical reaction step such as a process of treating a petroleum fraction using a catalyst subjected to an activation treatment by chloride or the like. The absorbent of the present invention absorbs chlorohydrocarbon, has a high adsorption rate, has a large absorption capacity, and is difficult to undergo desorption of the absorbed chlorohydrocarbons.

In the chloride absorbing tower, the leak of chlorohydrocarbons at the outlet of the absorbing tower can be delayed by installing the attapulgite-containing absorbent of the present invention after an absorbent of hydrogen chloride or an absorbent having a lower absorption ability of chlorohydrocarbon than the hydrogen chloride absorption ability, for example an absorbent comprising zinc oxide. Accordingly, it is possible to provide an absorption method capable of absorbing both of the inorganic halogen compounds coexisting with the chlorohydrocarbon in the hydrocarbon fluid and adjusting the leak time from the respective absorbent. As a result, the chloride absorption tower can be stably operated for a long period of time, so that it has a high operational value. It is also possible to provide an absorbing apparatus which can control to about the same time by adjusting the respective leak times according to the amount of the inorganic halogen compound and the chlorohydrocarbon generated in the process.

It is also possible to mix the attapulgite-containing absorbent of the present invention with a conventional halogen absorbent containing zinc oxide or the like as a main component. However, in this case, it is difficult to appropriately absorb the organic and inorganic halogen compound which is a fluid to be treated, according to the component composition, and it is not always preferable to obtain a preferable result. For this reason, a better result in view of safety and economy can be obtained by adjusting volume ratio of filling the two absorbents filled separately in a same apparatus to be coupled, or filling an either absorbent in one apparatus to be coupled in series, since optimization of the treatment of an optimum halogen compound according to the type of raw material, the reaction condition or the like can be performed.

BRIEF DESCRIPTION OF THE DRAWINGS

FIG. 1 shows an example of a halogen gas removal system of the present invention. (Configuration of an improved halogen gas removal system)

DETAILED DESCRIPTION OF THE INVENTION

One embodiment of the present invention relates to an absorbent comprising attapulgite, which is used to remove an organohalogen compound, e.g., a halogenated hydrocarbon, from a fluid comprising a hydrocarbon (typically a gas). Here the fluid comprising the hydrocarbons, particularly gases comprising hydrocarbons (hereinafter also referred to as "hydrocarbon gases") comprises organohalogen compounds and optionally inorganic halogen compounds. The absorbent has absorption characteristics with respect to a halogen compound, particularly an organohalogen compound (preferably a chlorohydrocarbon), and is preferably a solid. In view of absorbing an organohalogen compound in a gas into the absorbent by treating the hydrocarbon gas with the absorbent to remove an organohalogen compound from the hydrocarbon gas, in this specification, an "absorbent" is also referred to as a "remover"

The attapulgite in the present invention is a natural silicate mineral, also called palygorskite. Although the composition varies somewhat depending on the mining site, the manufacturing method or the like, any attapulgite can be used in the present invention. The attapulgite is composed of about 59% as silicon oxide, 11% as aluminum oxide, 3.6% as iron oxide, and 11% as magnesium oxide as weight composition ratio of as an example. A product in a powder state having such a composition is supplied from Union Chemical Co., Ltd., or the like, and is easily available.

The average particle size of the attapulgite preferably is 0.01-3 μm, preferably 0.03-0.5 μm by microscopic observation such as an electron microscope. The surface area of the attapulgite is 100 to 400 m$^2$/g, more preferably 150 to 300 m$^2$/g by BET measurement method.

The higher the content weight composition of attapulgite in the absorbent of the present invention, the higher the amount of absorption of the chlorohydrocarbon, which is preferable. Therefore the absorbent is preferably formed of attapulgite only. However, it is possible to add other additives depending on the content of the fluid to be treated, the physical strength of the molded body required, or the like, but the weight composition of attapulgite is preferably 40% by weight or more, more preferably 50% by weight or more, still more preferably 60% by weight or more, still more preferably 75% by weight or more, even more preferably 80% by weight or more, particularly preferably 90% by weight or more, based on the total weight of the absorbent. In a preferred embodiment of the present invention, the organohalogen compound absorbent of the present invention comprises the attapulgite as a main component, that is, the attapulgite is 50% by weight or more based on the total weight of the absorbent, and/or the attapulgite is comprised in an amount greater than any other component contained in the absorbent.

As described above, although the organohalogen compound absorbent of the present invention may comprise components other than attapulgite, in one embodiment of the present invention, the absorbent does not further comprise a basic calcium compound, or even when comprising a basic calcium compound, the amount of the basic calcium compound is less than 30% by weight, or less than 20% by weight or less than 10% by weight, based on the total weight of the absorbent. Examples of the basic calcium compound include calcium hydroxide, calcium carbonate, calcium oxide and calcium aluminate.

In another embodiment, the organohalogen compound absorbent of the present invention further comprises no zinc oxide, or even if it further comprises a zinc oxide, less than 10% by weight, or less than 5% by weight, or less than 3% by weight based on the total weight of the absorbent. In a further embodiment of the present invention, the organohalogen compound absorbent of the present invention further contains no calcium oxide, or even when comprising calcium oxide, the content thereof is less than 10% by weight, or less than 5% by weight or less than 3% by weight, based on the total weight of the absorbent.

In the absorbent of the present invention, it is also possible to comprise a porous material other than attapulgite, hereinafter simply referred to as "porous material", such as diatomaceous earth. The porous material may be a porous material having, for example, micropores or macropores. For example, when the absorbent is in the form of a molded body, the porous material can facilitate gas diffusion in the molded body.

When the absorbent of the present invention comprises a porous material, the absorbent may comprise a porous material in an amount of from 1 to 60% by weight, for example, from 20 to 50% by weight, based on the total weight of the absorbent. When the absorbent of the present invention comprises a porous material, the weight ratio of the attapulgite to porous material may be from 40:60 to 99:1, preferably from 50:50 to 80:20. In a composition having an attapulgite amount smaller than these ranges, the absorption ability of the chlorohydrocarbon decreases, and the physical strength tends to decrease, and in a composition larger than these ranges, the effect of gas diffusion by the porous material is not sufficiently exhibited.

Although the shape and size of the absorbent of the present invention can be appropriately selected depending on the use form thereof, it is preferable that the absorbent is molded in various forms such as a cylindrical shape, a disk shape and a tube shape in order to improve permeability and absorptivity of a fluid containing an organohalogen compound such as a halogenated hydrocarbon. In a preferred embodiment of the present invention, the absorbent is in the form of a molded article. Generally, cylindrical pellets having a diameter of 1 to 6 mm and a length of about 3 to 20 mm are suitably used. However, the present invention is not limited thereto, and may be made into pellets of various different shapes, tablet shapes, granular and crushed granular, or particulate by spray drying, or the like.

The absorbent of the present invention can be made by mixing the attapulgite only, and optionally a diatomaceous earth as a porous material, and optionally a dispersion medium is added, and kneaded, and then molded followed by drying. The attapulgite and the diatomaceous earth are usually provided as a powder. In that case, the powders are weighed and mixed. For example, to produce a typical extruded cylindrical pellet, a required amount of an additive is optionally added to a predetermined amount of attapulgite, water can be added to knead after dry mixing. When water is added, it is desirable to divide and charge the mixture so that the mixture does not become uneven. For kneading, for example, a muller or the like can be used. In addition to the purpose of uniformly mixing the additives, the dispersion medium can be used to impart cohesive force to maintain a constant shape in the molding and drying steps. Water is suitably used as the dispersion medium, and an organic solvent such as alcohol or other additives may be used if necessary.

The kneaded raw material can then be molded. Molding can be performed using, for example, a disc pelleter or a plunger extruder.

Usually, the molded remover is then dried. The above drying can be carried out, for example, at a temperature of 80 to 400° C., preferably at a temperature of 120 to 300° C.

The halogen compound, preferably selectively and/or preferentially an organohalogen compound, can be removed from the gas by contacting the hydrocarbon gas containing a halogen compound with the absorbent produced as described above, and holding them for an appropriate time if necessary, and absorbing the halogen compound contained in the hydrocarbon gas into the absorbent, preferably selectively and/or preferentially absorbing the organohalogen compound.

Here, the organohalogen compound absorbent of the present invention can be used for a process of treating a petroleum fraction using a catalyst subjected to an activation treatment by chloride or the like, or for removing an organohalogen compound derived from crude oil or various petroleum refining processes. The process using the activated catalyst described above comprises a catalytic regeneration process such as catalytic reforming of a naphtha fraction and oxychlorination in a moving bed type catalytic reforming process, and a reaction process such as aromatization of a heavy naphtha. Petroleum fractions distilled from such processes include heavy naphtha, light naphtha or BTX. The present invention can be suitably used for a mixture comprising an organohalogen compound, and optionally an inorganic halogen compound, and a hydrocarbon generated from the said process. Although the present invention can be used even for a liquid hydrocarbon, it can be suitably used for a gas fraction, by-product gas, obtained by gas-liquid separation of a hydrocarbon gas distilled from the process, typically a hydrocarbon distilled from the process, since a gaseous one can increase the space velocity in consideration of the amount of treatment per unit time and the like. As such hydrocarbon gases containing an organohalogen compound and optionally an inorganic halogen compound, particularly a by-product gas generated from a catalytic reformer can be suitably used. The hydrocarbon gas comprising the organohalogen compound, and optionally an inorganic halogen compound, may comprise other gas components such as hydrogen gas and carbon monoxide in addition to an organohalogen compound, and optionally an inorganic halogen compound.

In a preferred embodiment of the present invention, the organohalogen compound can be selectively and/or preferentially removed from the hydrocarbon gas by using the absorbent of the present invention.

The treatment using the halogen compound absorbent of the present invention, i.e., the treatment for absorbing the organohalogen compound contained in a hydrocarbon gas into the absorbent to remove the organohalogen compound from the gas, can be preferably carried out at a temperature of 0 to 200° C., more preferably 20 to 140° C. The pressures is preferably from 0.2 to 6.0 MPa, more preferably from 1.0 to 4.0 MPa. The gas space velocity (GHSV) relative to the volume of the total adsorbent comprising the inorganic halogen compound absorber and the organohalogen compound absorbent is preferably 200 to 6000 $h^{-1}$, more preferably 800 to 5000 $h^{-1}$.

Accordingly, in one embodiment of the present invention, the present invention relates to the organohalogen compound absorbent for removing an organohalogen compound contained in a hydrocarbon gas. In another embodiment of the present invention, the present invention relates to the organohalogen compound absorbent for removing an organohalogen The present invention relates to use of the organohalogen compound absorbent described above for removing an organohalogen compound contained in a hydrocarbon gas.

Further, in one embodiment of the present invention, the invention is a method of removing an organohalogen compound from a hydrocarbon gas comprising an organohalogen compound and optionally an inorganic halogen compound, the method comprises step of i) contacting the hydrocarbon gas with the organohalogen compound absorbent. The step i) can be carried out, for example, by flowing the hydrocarbon gas into the absorbent at temperatures of from 0 to 200° C., preferably from 20 to 140° C. and/or at pressures of from 0.2 to 6.0 MPa, preferably from 1.0 to 4.0 MPa. The hydrocarbon gas can be flowed in at a space velocity of for example 200 to 6000 $h^{-1}$, more preferably 800 to 5000 $h^{-1}$ relative to the volume of the total adsorbent comprising the inorganic halogen compound absorber and the organohalogen compound absorbent.

The hydrocarbon gas described above may be a hydrocarbon gas containing a low concentration of an inorganic halogen compound e.g., hydrogen chloride. For example, an inorganic halogen compound e.g., hydrogen chloride is previously removed from the hydrocarbon gas by treatment with a known inorganic halogen compound absorber to reduce the concentration thereof. Preferably, said hydrocarbon gas is, for example a hydrocarbon gas comprising 0.1 mg-Cl/$Nm^3$ or less of a hydrogen chloride.

The organohalogen compound absorber of the present invention can be used alone, or in combination with other halogen compound absorbent, preferably with an absorbent having a higher ability to absorb an inorganic halogen compound than an ability to absorb an organohalogen compound, which is also referred to herein as an "inorganic halogen compound absorber". For example, in the petroleum fraction treatment process or the petroleum refining process described above, an inorganic halogen compound such as hydrogen chloride can be generated, but by using both absorbents in combination, it is possible to efficiently remove the inorganic halogen compound and an organohalogen compound from a hydrocarbon gas.

The organohalogen compound absorbent of the present invention is preferably used in combination with an inorganic halogen compound absorber, e.g. an absorbent comprising a zinc oxide and/or calcium oxide or the like, typically used in couple. The inorganic halogen compound absorber comprises, for example from 10 to 95% by weight, preferably from 20 to 90% by weight of zinc oxide, and/or from 5% by weight or more, preferably from 10 to 80% by weight, more preferably from 20 to 50% by weight of calcium oxide, based on the total weight of the absorbent. The inorganic halogen compound absorber comprises, for example bentonite in an amount of preferably 5 to 50% by weight based on the total weight of the absorbent. The inorganic halogen compound absorber comprises, for example a silica magnesia composite oxide in an amount of preferably 10 to 80% by weight based on the total weight of the absorbent. The absorbents comprising such zinc oxide and/or calcium oxide or the like are capable of absorbing both an inorganic halogen compound, e.g., an organic halide gas such as hydrogen halide gas, but particularly have high absorption capacity of the former. The inorganic halogen compound absorber is not particularly limited as long as it is an absorbent capable of absorbing an inorganic halogen compound such as hydrogen chloride, preferably an absorbent capable of selectively and/or preferentially absorbing an inorganic halogen compound than an organohalogen compound. Such an absorbent is known, for example an absorbent described in any of Patent Documents 1, 3 or 4, and an absorbent sold under the product name of Actisorb® Cl10 from Clariant Catalyst K. K. can be used.

The absorbent comprising attapulgite of the present invention, hereinafter, also referred to as "absorbent A", can efficiently absorb and remove both an inorganic halogen compound and an organohalogen compound by combining with an absorbent having high absorption ability of an inorganic halogen compound, also referred to as "absorbent B". Here, as absorbent B, the above-described absorbent can be suitably used.

Absorbent A can be connected in series with absorbent B, preferably arrange absorbent A in downstream, preferably at a subsequent stage of absorbent B. FIG. 1 shows a picture of a halogen compound absorbing apparatus (3) an absorbent B (1) for an inorganic halogen compound, and an attapulgite absorbent A (2). The reason for arranging A in the downstream side, for example at the subsequent stage is that structural disintegration of attapulgite absorbent A due to hydrogen halide can be prevented by first removing hydrogen halide such as hydrogen chloride from a mixture of hydrogen chloride and an organohalogen compound with absorbent B.

Accordingly, in one embodiment of the present invention, the present invention relates to the organohalogen compound absorbent for removing an organohalogen compound from a hydrocarbon gas previously treated with an inorganic halogen compound absorber comprising zinc oxide and/or calcium oxide. In other words, in this embodiment the inorganic halogen compound, e.g., hydrogen chloride, is removed from the hydrocarbon gas by treatment with the inorganic halogen compound absorber, and the concentration thereof is lowered in advance, preferably to 0.1 mg-Cl/$Nm^3$ or less, prior to treatment with the organohalogen compound absorbent.

In another embodiment of the present invention, the invention relates to a use of the above-mentioned organohalogen compound absorbent for removing an organohalogen compound from a hydrocarbon gas previously treated with an inorganic halogen compound absorber comprising a zinc oxide and/or a calcium oxide.

Further, in one embodiment of the present invention, the present invention relates to a method of removing an organohalogen compound and an inorganic halogen compound from a hydrocarbon gas comprising an organohalogen compound and an inorganic halogen compound, the method comprises steps of:
  a) contacting the hydrocarbon gas with an inorganic halogen compound absorber, and
  b) contacting the hydrocarbon gas obtained after step a) with the organohalogen compound absorbent in the downstream of step a). Here, the step a) can be carried out by flowing the hydrocarbon gas into the inorganic halogen compound absorber at a temperature of, for example 0 to 200° C., preferably 20 to 140° C., and/or at a pressure of 0.2 to 6.0 MPa, preferably 1.0 to 4.0 MPa. The step b) may be carried out by flowing the hydrocarbon gas into the organohalogen compound absorbent at a temperature of, for example 0 to 200° C., preferably 20 to 140° C., and/or at a pressure of 0.2 to 6.0 MPa, preferably 1.0 to 4.0 MPa, wherein the inorganic halogen compound e.g., hydrogen chloride in the hydrocarbon gas was removed in step a) to reduce its concentration, preferably reduced to 0.01 mg-Cl/Nm$^3$ or less. The hydrocarbon gas can be flowed in at a space velocity of, for example, 200 to 6000 h$^{-1}$, preferably 800 to 5000 h$^{-1}$ relative to the volume of the both of the inorganic halogen compound absorber and the organohalogen compound absorbent. By such a method, both of the inorganic halogen compound, preferably hydrogen chloride, and the organohalogen compound, preferably chlorohydrocarbon can be efficiently removed from the hydrocarbon gas.

The hydrocarbon gas to be treated by the absorbent of the present invention and the method using the same can be a gas comprising a hydrocarbon e.g., a by-product gas as described above, generated or distilled from, for example, a catalytic reforming step as described above or from a catalytic reforming apparatus used thereof. The gas usually comprises an inorganic halogen compound or an organohalogen compound generated in these steps or the like. Accordingly, in one embodiment of the present invention, the present invention relates to the use of the organohalogen compound absorbent for removing an organohalogen compound from a hydrocarbon gas distilled from a catalytic reforming step and previously treated with an inorganic halogen compound absorber, preferably an inorganic halogen compound absorber comprising zinc oxide and/or calcium oxide. In a further embodiment of the present invention, the present invention relates to a method of producing a hydrocarbon gas having a low inorganic halogen compound concentration (typically hydrogen chloride concentration) and an organohalogen compound concentration (typically chlorohydrocarbon concentration) from a hydrocarbon gas comprising the inorganic halogen compound and the organohalogen compound distilled from a catalytic reforming process, the method comprises steps of:

1) contacting a hydrocarbon gas distilled from a catalytic reforming step with an inorganic halogen compound absorber, preferably an inorganic halogen compound absorber comprising a zinc oxide and/or a calcium oxide, and
2) contacting the hydrocarbon gas obtained after step 1) with the organohalogen compound absorbent in the downstream of step 1).

Here, in step 1) and step 2) above, the conditions of temperature, pressure and space velocity described above with respect to step a) and b) respectively can be used. By such a method, both an inorganic halogen compound, preferably hydrogen chloride, and an organohalogen compound, preferably a chlorohydrocarbon, can be efficiently removed from a hydrocarbon gas distilled from a catalytic reforming step, as a result, a hydrocarbon gas having a low inorganic halogen compound concentration (typically a hydrogen chloride concentration) and an organohalogen compound concentration (typically a chlorohydrocarbon concentration), for example the hydrocarbon gas having a hydrogen chloride concentration of 0.1 mg-Cl/Nm$^3$ or less and a chlorohydrocarbon concentration of 0.3 mg-Cl/Nm$^3$ or less, can be obtained.

Further, in another embodiment of the present invention, the present invention relates to a halogen compound absorbing apparatus having an inorganic halogen compound absorbing region provided with the inorganic halogen compound absorber and an organohalogen compound absorbing region provided with the organohalogen compound absorbent and arranged at a stage subsequent to the inorganic halogen compound absorbing region, preferably in series as shown in FIG. 1. In the apparatus, it the filling amount of the inorganic halogen compound absorber and the organohalogen compound absorbent can be adjusted according to the concentration ratio of the organohalogen compound, e.g. halogenated hydrocarbon, preferably chlorohydrocarbon and the inorganic halogen compound, e.g. hydrogen chloride in the hydrocarbon gas. The apparatus shown in FIG. 1, the inorganic halogen compound absorbing region and the organohalogen compound absorbing region are separately arranged and interconnected in the same apparatus, but it is also possible to connect another apparatus (tower) comprising an organohalogen compound absorbing region downstream of the apparatus (tower) comprising an inorganic halogen compound absorbing region to construct a halogen gas removing system.

In a further embodiment of the present invention, the present invention relates to the apparatus for absorbing a halogen compound generated in a catalytic reforming step. In another embodiment, the present invention relates to the use of the apparatus for absorbing halogen compounds generated in a catalytic reforming step. The structure of attapulgite refers to refers to a hollow needle-like crystal structure characteristic of attapulgite, it is presumed that the adsorption capacity of the chlorohydrocarbon is large because of its very large surface area. When a fluid comprising an inorganic hydrogen chloride at a high concentration is directly flowed into attapulgite, the hollow needle-like structure could collapse, and the adsorption ability of the target hydrocarbon could be lowered. But when the hydrogen chloride is removed and brought into a low concentration and then flowed in, the crystal structure could be maintained. Example below explains that the absorbent arranged in such way exhibits high chloride hydrocarbon absorption ability.

Examples are shown below and the present invention will be described in more detail, but the present invention is not limited in any way by the following examples.

EXAMPLES

The performance evaluation of the absorbent used in the following Examples and Comparative examples was according to the following method.

Evaluation of chlorohydrocarbon and hydrogen chloride absorption: The chloride absorbent is filled in a 150 ml cylindrical adsorption tower and a test gas was vented at a GHSV of 4500 h$^{-1}$, a temperature of 35° C. and a pressure of 3.4 MPa. The test gas subjected to gas-liquid separation from a hydrocarbon oil obtained by reforming a heavy naphtha by a catalytic reformer was used. The hydrogen chloride concentration contained in the test gas was 10 mg-Cl/Nm$^3$ in average and the chlorohydrocarbon concentration was 3 mg-Cl/Nm$^3$. The hydrogen chloride concentration of 10 mg-Cl/Nm$^3$ means that the quantity of chlorine in 1 m$^3$ at atmospheric pressure (0.1 MPa), 0° C., is 10 mg.

In the test, the time till the organic chloride concentration in the treated gas reached 0.03 mg-Cl/Nm$^3$ was measured, hereinafter the time is described as "chlorohydrocarbon absorption treatment time". The hydrogen chloride concentration when the organic chloride concentration in the gas reached 0.3 mg-Cl/Nm$^3$ was also examined, hereinafter, described as "hydrogen chloride concentration at the chlorohydrocarbon breakthrough time".

The absorbents of Example 1, Comparative Example 1, Comparative Example 2, and Reference Example 1 was filled respectively in a absorption tower and arranged in parallel to pass the test gas and simultaneously evaluated. Although the chlorine concentration in the test gas varied, comparable data can be obtained for the adsorption towers evaluated at the same time for having the same variation history.

The hydrogen chloride concentration and the chlorohydrocarbon in the gas to be treated were measured as follows. The gas to be treated was sequentially flowed through ion exchange water and xylene, and the chloride absorbed in the ion exchange water was used as a hydrogen chloride, and the chloride absorbed in the xylene was used as a chlorohydrocarbon. The chloride absorbed in the ion-exchanged water was examined using an anion chromatograph of a suppressor system (LC-20A ion chromatosystem from Shimadzu Corporation) to quantify the hydrogen chloride concentration in the test gas to be treated. The chloride absorbed in the xylene was examined using (TS-300 from Mitsubishi Chemical Analytec Co., Ltd., compliance with ASTM D5808) to quantify the chlorohydrocarbon concentration in the test gas to be treated. The analysis was performed every 24 hours.

For performance assessment, the chlorine absorbent ActiSorb® Cl10 manufactured and sold by Clariant Catalyst K. K. and a chlorohydrocarbon absorbent prepared by the following procedure. ActiSorb Cl® 10 was made of zinc oxide and silica magnesia composite oxide, and a cylindrical extruded body having a diameter of 4.8 mm was used.

Example 1

2.0 kg of attapulgite powder was dry mixed in a kneader for 10 minutes. After the dry mixing, a kneaded cake was obtained by mixing while adding water. The obtained kneaded cake was extruded into a cylindrical pellet having a diameter of 2.5 mm, and dried at 270° C. for 3 hours. The obtained molded body is referred to as absorbent A. ActiSorb® Cl10, hereinafter referred to as absorbent B, was filled in 80% by volume of the adsorption tower on the side of the gas inlet, and absorbent A was filled in 20% by volume on the side of the gas outlet. Subsequently, the absorption of the chlorohydrocarbon and the hydrogen chloride was evaluated.

Comparative Example 1

2.0 kg of bentonite powder was dry mixed in a kneader for 10 minutes. After the dry mixing, a kneaded cake was obtained by mixing while adding water. The obtained kneaded cake was extruded into cylindrical pellets having a diameter of 2.5 mm, and dried at 270° C. for 3 hours. The obtained molded body is regarded as absorbent C.

Absorbent B (ActiSorb® Cl10) was filled in the 80% by volume of the adsorption tower on the side of the gas inlet, and the absorbent C was filled in 20% by volume on the side of the gas outlet. Subsequently, the absorption of the chlorohydrocarbon and the hydrogen chloride was evaluated.

Comparative Example 2

Absorbent B (ActiSorb® Cl10) was filled in 100% by volume of the adsorption tower. Subsequently, the absorption of the chlorohydrocarbon and the hydrogen chloride was evaluated.

Reference Example 1

Absorbent B (ActiSorb® Cl10) was filled in 70% by volume of the adsorption tower. The rest of 30% by volume was not filled to leave it as a void. The evaluation was performed at the same flow rate as in other Example and Comparative Examples. Subsequently, the absorption of the chlorohydrocarbon and the hydrogen chloride was evaluated. With respect to this absorption tower, in addition to examining the "chlorohydrocarbon absorption treatment time", the hydrogen chloride concentration was examined at the time when the chlorohydrocarbon in the gas to be treated reached 0.3 mg-Cl/Nm$^3$ in Example 1 where the "chlorohydrocarbon absorption treatment time" was the longest among tests performed at the same time.

The results of Example 1, Comparative Examples 1 and 2, and Reference Example 1 are shown in Table 1

TABLE 1

|  | Example 1 | Comparative Example 1 | Comparative Example 2 | Reference 1 |
|---|---|---|---|---|
| Absorbent A (vol. %) | 20 | 0 | 0 | 0 |
| Absorbent B (vol. %) | 80 | 80 | 100 | 70 |
| Absorbent C (vol. %) | 0 | 20 | 0 | 0 |
| Chlorohydrocarbon absorption treatment time (time) | 480 | 312 | 312 | 216 |
| Hydrogen chloride concentration at the chlorohydrocarbon breakthrough time (mg-Cl/Nm$^3$) | <0.1 | <0.1 | <0.1 | <0.1 |
| Absorbing time of Absorbent B | 248 | 248 | 312 | 216 |
| Duration of Absorbent A (time) | 232 | — | — | — |
| Duration of Absorbent B (time) | — | — | 312 | 216 |
| Duration of Absorbent C (time) | — | 64 (312-248) | — | — |

From Reference Example 1, the retention time per 1% by volume of absorbent B was 3.1 hours by dividing the leak time of 216 hours by the absorbent volume occupancy of 70%. From Comparative Example 2, almost the same retention time is obtained, it can be seen that the leak time of the absorbent B is proportional to the volume percent (%).

In Example 1, since the absorbent B occupies 80% volume, the retention time of the chlorohydrocarbon by only B on the upstream side becomes 248 hours, and the difference 232 hours from the 480 hours of Example 1 when connected in series is due to the contribution of 20% of absorbent A. Since the absorption capacity of absorbent B by the 20% volume was 62 hours (20×3.1), the chlorohydrocarbon absorption capacity of absorbent A was about 3.7 times (232/62) that of absorbent B. When calculated from Comparative Example 1, it was shown that absorbent A of Example 1 had an absorption capacity of about 3.6 times 232/(312-248) as high as that of the bentonite absorbent C.

From the above results, the treatment ability of the chlorohydrocarbon in the present invention is remarkably higher in the organohalogenated hydrocarbon absorption ability than a conventional halogen absorbent comprising zinc. The throughput for the hydrocarbon gas comprising both a hydrogen chloride and a chlorohydrocarbon gas could increase by a factor of 2 or so by simply filling about 20% volume of the total volume of halogen absorbent.

DESCRIPTION OF CODE

1. Inorganic halogen compound absorbent B
2. Organohalogen compound absorbent A
3. Halogen compound absorbing apparatus

The invention claimed is:
1. A method of removing an organohalogen compound and an inorganic halogen compound from a hydrocarbon gas, wherein the method comprises
   a) contacting the hydrocarbon gas with an inorganic halogen compound absorber, and b) contacting the hydrocarbon gas obtained after step a) with an organohalogen compound absorbent in a downstream of step a),
wherein the organohalogen compound absorbent comprises attapulgite of at least 80% by weight, based on the total weight of the organohalogen compound absorbent.

2. The method of claim 1, wherein the inorganic halogen compound absorber comprises a zinc oxide and a calcium oxide.

3. The method of claim 1, wherein the inorganic halogen compound comprises hydrogen chloride and the organohalogen compound comprises a chlorohydrocarbon.

4. The method of claim 3, wherein the hydrogen chloride concentration in the hydrocarbon gas is reduced to 0.1 mg-Cl/Nm$^3$ or less with the inorganic halogen compound absorber in step a), and then the chlorohydrocarbon is absorbed and removed from the hydrocarbon gas in step b).

5. The method of claim 1, wherein the organohalogen compound absorbent is formed of attapulgite only.

6. The method of claim 1, wherein the organohalogen compound absorbent is in the form of a molded body.

7. A halogen compound absorbing apparatus comprising an inorganic halogen absorbing region equipped with an inorganic halogen compound absorber and an organohalogen compound absorbing region arranged in series at a subsequent stage of the inorganic halogen compound absorbing region and equipped with an organohalogen compound absorbent, wherein the organohalogen compound absorbent comprises attapulgite of at least 80% by weight, based on the total weight of the organohalogen compound absorbent.

8. The halogen compound absorbing apparatus of claim 7, wherein the organohalogen compound absorbent is formed of attapulgite only.

9. The halogen compound absorbing apparatus of claim 7, wherein the organohalogen compound absorbent is in the form of a molded body.

10. A method of producing a hydrocarbon gas having hydrogen chloride concentration and a chlorohydrocarbon concentration reduced from a hydrocarbon gas distilled from a catalytic reforming step, wherein the method comprises
1) Contacting the hydrocarbon gas distilled from the catalytic reforming step with an inorganic halogen compound absorber and
2) contacting the hydrocarbon gas obtained after step 1) with an organohalogen compound absorbent downstream of step 1), wherein the organohalogen compound absorbent comprises attapulgite of at least 80% by weight, based on the total weight of the organohalogen compound absorbent.

11. The method of claim 10, wherein the inorganic halogen compound absorber comprises a zinc oxide and a calcium oxide.

12. The method of claim 10, wherein the hydrocarbon gas produced has a hydrogen chloride concentration of 0.1 mg-Cl/Nm$^3$ or less and a chlorohydrocarbon concentration of 0.3 mg-Cl/Nm$^3$ or less.

13. The method of claim 10, wherein the inorganic halogen compound absorber comprises a zinc oxide or a calcium oxide.

* * * * *